United States Patent Office 3,329,399
Patented July 4, 1967

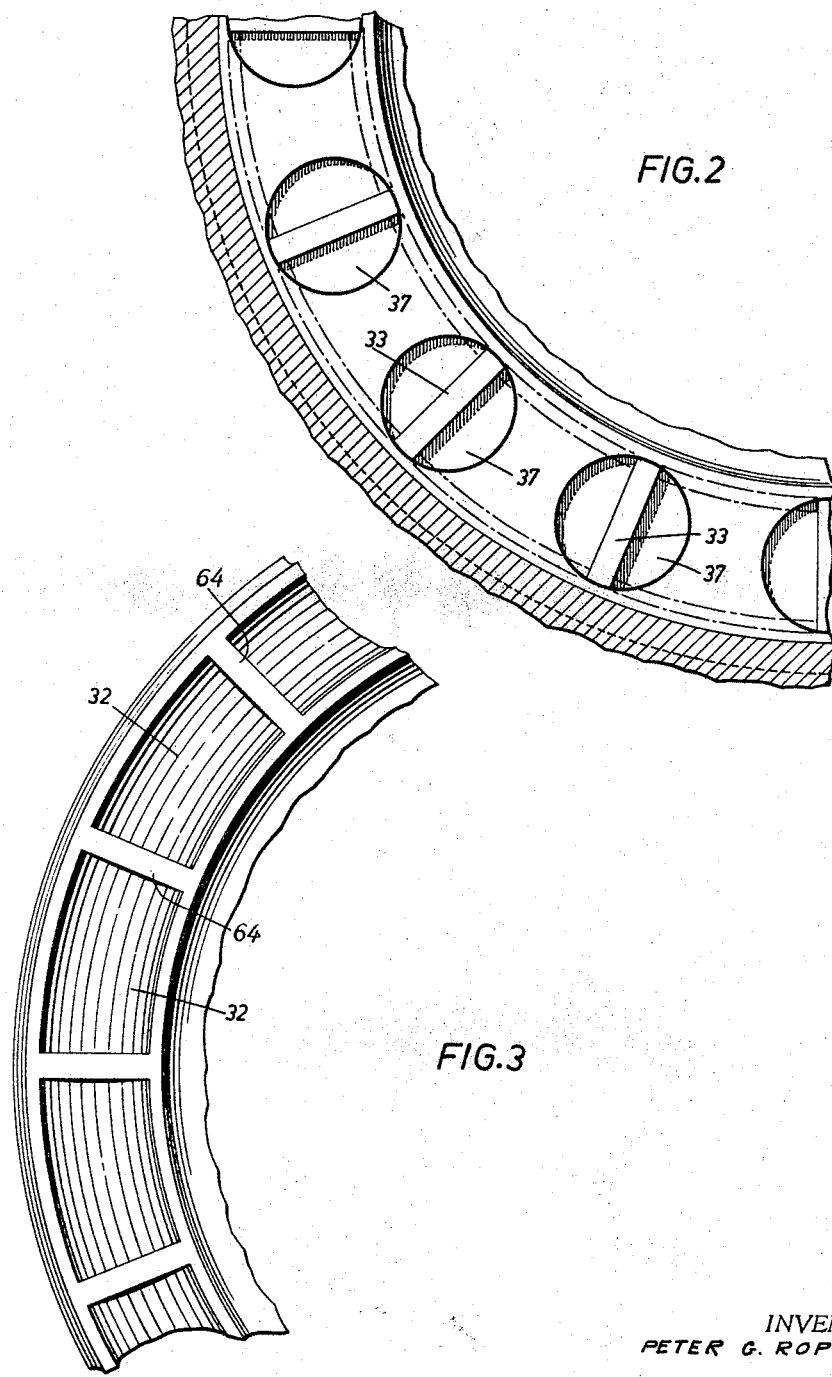

3,329,399
FLUID BRAKE FOR ROTARY HYDRAULIC MACHINES
Peter G. Roper, Westmount, Quebec, Canada, assignor to Dominion Engineering Works, Limited, Lachine, Quebec, Canada, a corporation of Canada
Filed Dec. 19, 1966, Ser. No. 603,032
8 Claims. (Cl. 253—26)

This invention is directed to an improved fluid brake for rotary hydraulic machines, and in particular to a fluid brake for use with rotary machines having shrouded runners of the type including centrifugal pumps, Francis turbines, and shrouded pump-turbines.

In the operation of rotary hydraulic machines, particularly power generating turbines, it is desirable to provide speed braking means in order to be able to limit the maximum speed of the runner, under conditions of load rejection or incorrect functioning of other control arrangements.

A braking device suitable for use in the described manner is disclosed in United States Patent No. 3,246,874, which issued Apr. 19, 1966, the inventor being Sproule. However, the brake means disclosed in this patent suffer from a number of disadvantages. Firstly, when starting a machine equipped with fluid brakes located in the shroud spaces, the fluid drag exerted against the runner of the machine by the brake element is substantial, since at this stage of operation the shroud space is normally flooded with the working fluid. Secondly, during operation of the machine, when the shroud space has been aerated by the admission of air or other water excluding gas to the sealed off shroud space, the efficiency of the runner is somewhat impaired by the parasitic air drag which the brake elements exert upon the runner, so that the net gain in efficiency provided by aeration of the runner shroud spaces is reduced.

An object of the present invention is to provide an improved brake arrangement to facilitate starting and operation of the hydraulic machine so equipped.

A further object of the present invention is to provide a fluid brake arrangement having minimal drag characteristics when in the non-operating condition.

The present invention provides a fluid brake arrangement having brake pocket elements mounted for rotation with the runner of the machine and having a corresponding series of brake pocket elements in facing relation therewith, both sets of elements being located in annular clearance zones that are normally dewatered during operation of the machine by the injection of air into the annular space, wherein actuator means are provided for shifting the pocket forming elements mounted on the stationary portion of the machine in order to reduce their effective cooperation with the pocket elements on the runner portion of the machine.

In one embodiment the pocket elements are retracted axially away from the corresponding pockets mounted on the runner in order to minimize interaction of fluid, both air and water, between the opposing pockets. In a second embodiment, the transversely extending rib members which define the ends of the pockets are mounted for rotation so that they can be pivoted about an axis parallel with that of the runner main axis, thereby presenting the ends of the plate-like elements in place of the lateral face of the element for interaction with fluid entrained by the rotating pockets mounted on the runner.

What is provided is a fluid brake arrangement for use with a rotary hydraulic machine of the type including centrifugal pumps, Francis turbines, and pump-turbines of the shrouded variety having means for aerating an annular shroud space adjacent a shrouded portion of the runner of the machine, comprising first annular array of brake elements coaxially mounted on an outer shrouded portion of the runner to extend within an aerated space, having baffle members extending transversely to the direction of motion of the elements forming a plurality of fluid energizing cups; second annular array of brake elements mounted on the casing structure of the turbine in facing relation with the runner cups, and extending into the aerated space, being movable from a first operative position for effecting braking in cooperation with the runner cups to a second, inoperative position; and actuator means for moving the second brake elements between the first and the second positions. Operation of the brake system is effected by an actuator motor or motors energized by the occurrence of overspeeding of the runner, or by manual control.

Certain embodiments of the present invention are described by way of example, reference being had to the accompanying drawings, wherein:

FIGURE 2 is a view taken on the arrow 2—2 of FIGURE 1;

FIGURE 3 is a view taken on the arrow 3—3 of FIGURE 1;

Figure 1:
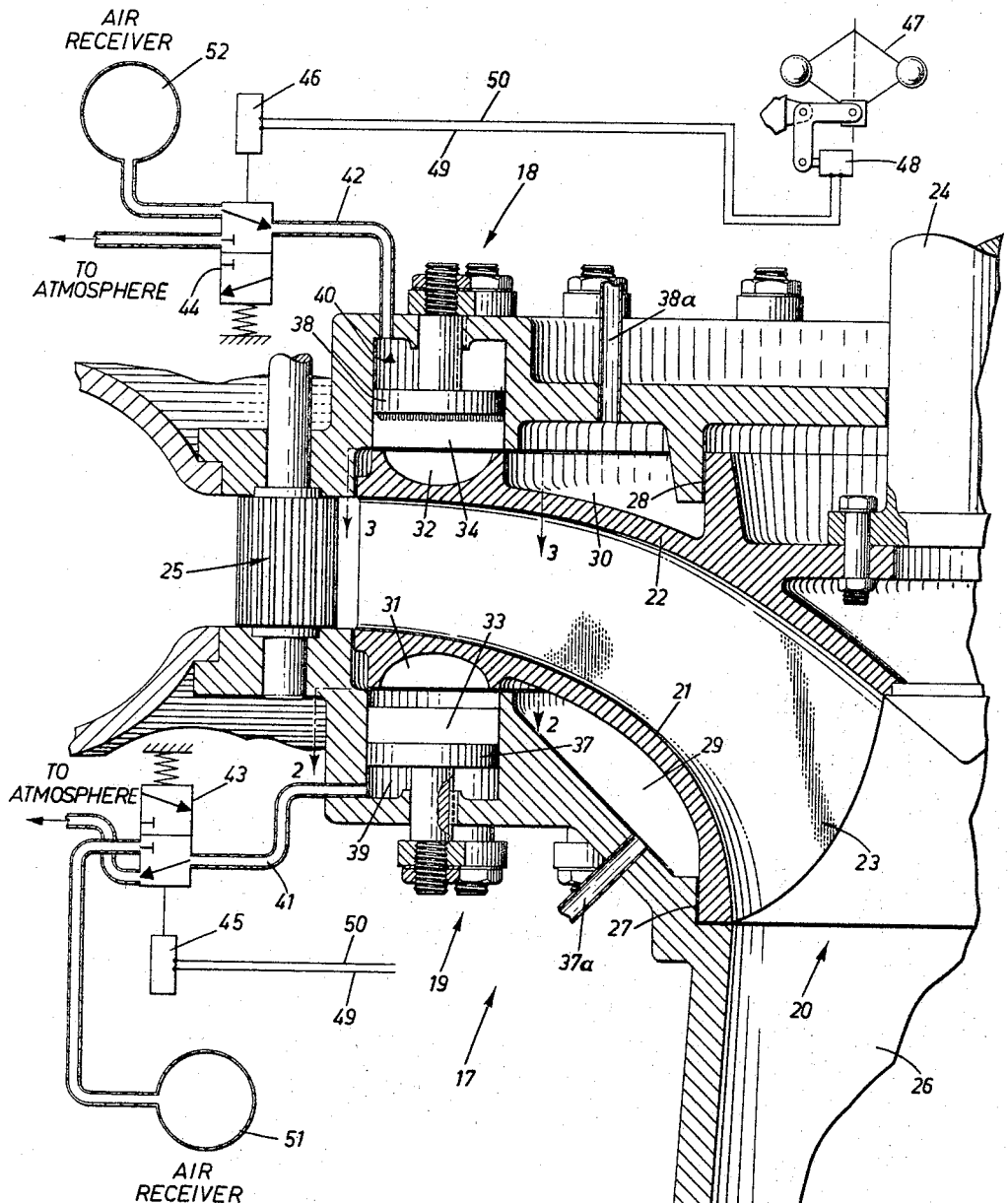
FIGURE 1 is a diagrammatic cross sectional elevation of a portion of a hydraulic machine incorporating a first embodiment of the invention.
Figure 4:
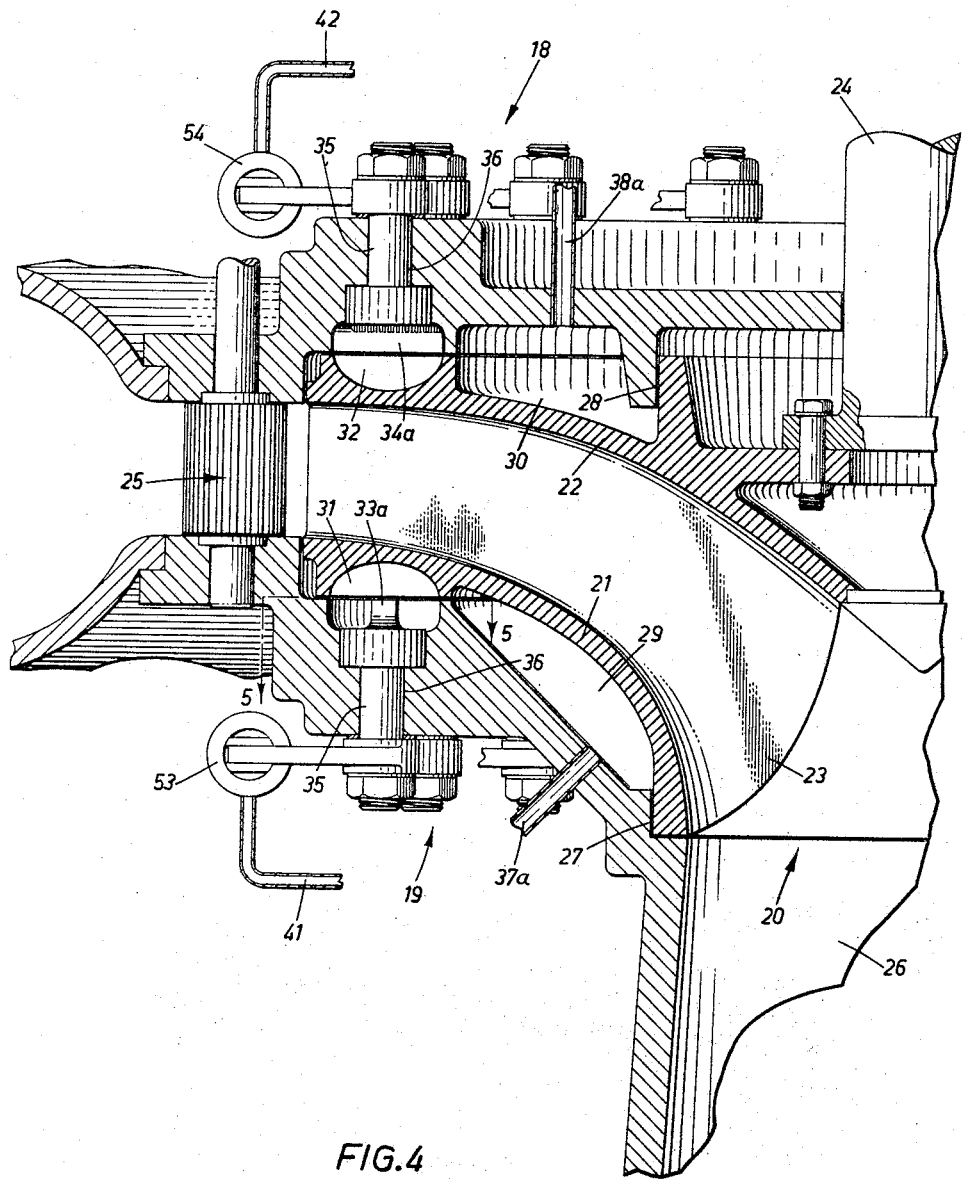
FIGURE 4 is a view corresponding to that of FIGURE 1, showing a second embodiment of the movable baffle means.

Referring to FIGURES 1 and 4, the turbine 17 includes upper and lower casing portions 18, 19 and a runner 20 having a lower annular shroud or skirt 21 and an upper or crown shroud 22, with blade members 23 extending therebetween.

The runner 20 is rotatably mounted upon shaft 24, water entering the turbine at 25 and passing therethrough into the draft tube 26.

Annular seal arrangements 27, 28 located radially inwardly of the lower and upper shrouds respectively serve to maintain annular shroud spaces 29, 30 in an aerated condition by means of air supplied through the pipes 37a, 38a, to the respective shroud spaces.

Referring to FIGURES 1, 3, and 4, a series of brake elements 31, 32 are mounted on the outer peripheries of the lower and upper shrouds 21, 22 respectively, being in the form of adjacent pockets separated by transverse partitions 64 (see FIG. 3).

In the arrangement illustrated in FIGURES 1 and 2 a plurality of cylinders 39, 40 in circumferential arrangement in the lower casing 19 and the upper casing 18 respectively receive pistons 37, 38 having transverse partition members 33 mounted on the outer face thereof and serving in the extended position to divide the annular channel facing the pockets 31, 32 into a corresponding series of opposing pockets. In the retracted position of the pistons 37, 38 the portion of the upper and lower stationary housings in facing relation with the pockets 32, 31 comprise a substantially uniform annular groove which provides minimal resistance to the flow of fluid therearound. The supporting guides of the pistons 34, 37 are keyed against rotation in the respective housing bores.

Figure 5:
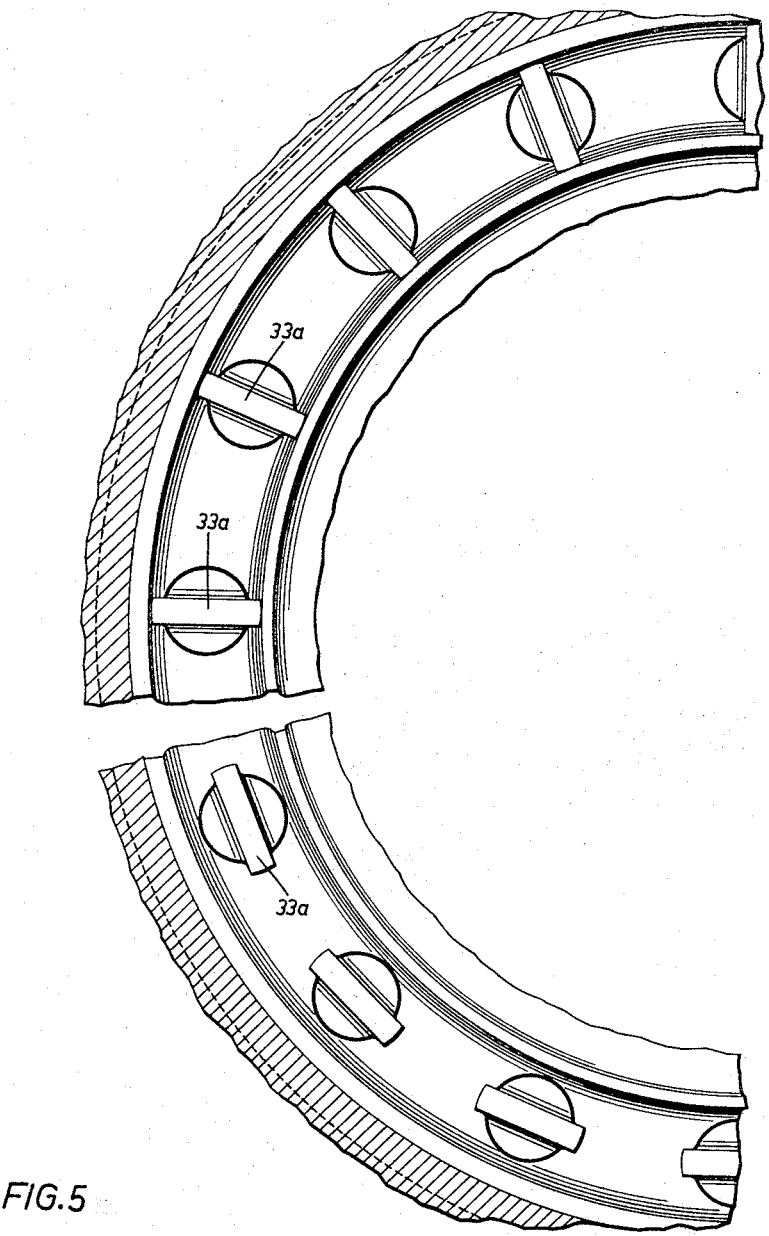
FIGURE 5 is a view taken on the line 5—5 of FIGURE 4.

Referring to the embodiment illustrated in FIGURES 4 and 5, the pocket partitions in the lower and upper stationary portions of the housing 19, 18, comprise partition members 33a, 34a pivotally mounted upon spindles 35 rotatably mounted in bushings 36 set in the respective housing portions. The upper member 34a is shown in the operative position, and the lower member 33a is shown in the inoperative position, for purposes of illustration. The angular position of each of the spindles 35 is controlled by a crank member connected with a respective actuator motor 53, 54 whereby the partition members 33a, 34a may be rotated to a braking or a non-braking position. Corresponding runner partitions 64 define pockets 32 on the runner.

Operation of the arrangement illustrated in FIGURE 1 may be effected by the supply of suitable pressure fluid, such as air (illustrated) to the cylinders 39, 40 by way of pipes 41, 42. The admission of air to the cylinders is controlled by way of control valves 43, 44 each of which is operatively positioned by means of a solenoid 45, 46 connected by leads 49, 50 with a limited switch 48 controlled by a centrifugally operated overspeed governor 47 which is rotatably driven by the runner 24.

In operation, if the runner overspeeds the switch 48 is actuated, causing the solenoid 45, 46 to position the valves 43, 44 so as to admit air from the pressurized air receivers 51, 52 into the respective pipes 41, 42, thus sliding the pistons 37, 38 axially within their respective cylinders 39, 40 and bringing the pockets defining transverse members 33, 34 into fluid interacting engagement with the opposite pockets 31, 32.

It is contemplated that the air pressure within the annular spaces 29, 30 is permitted to diminish so that water enters the annular brake zones and rapidly reduces the speed of the runner to a safe level.

It is further contemplated that water may be introduced by means of a separate supply into the region of the brakes in order to provide more rapid action without depressurizing the annular spaces 29, 30.

Owing to the reduced inertia of the moving parts of the arrangement illustrated in FIGURES 4 and 5, a more rapid response rate can be attained in rotating the partition members 33a, 34a between the active and the inactive positions, while the energizing motor is not required to maintain a sustaining force of any magnitude on the partition members 33a, 34a when in the operative position. However, this arrangement is not generally self cancelling, as in the case of the embodiment illustrated in FIGURES 1 and 2, wherein exhaustion of the cylinders 39, 40 to atmosphere permits the withdrawal of the braking pistons 37, 38 under the greater-than-atmospheric pressure that normally exists within the shroud spaces of the turbine.

It is contemplated that by mounting the partition members 33a, 34a in eccentric relation with the spindles 35, that a self cancelling characteristic can be obtained upon deenergization of the actuator motors 53, 54.

Use of a simplified actuator arrangement for the FIGURE 4 embodiment, employing a single motor operating in conjunction with a synchronizing ring for the upper and lower brake arrays is contemplated.

What I claim as new and desire to secure by Letters Patent of United States is:

1. A fluid brake arrangement for use with a shrouded rotary hydraulic turbo machine having means for aerating an annular shroud space adjacent a shrouded portion of the runner of the machine, comprising; first annular array of brake elements peripherally mounted on a shroud of the runner to extend within a said aerated space, having baffle members extending transversely to the direction of motion of the elements about the runner main axis to form a plurality of fluid energizing runner cups; second annular array of stationary brake elements mounted on the casing structure of the machine in facing relation with the runner cups and extending into said aerated space, being movable from a first operative position for effecting braking in cooperation with the runner cups to a second, inoperative position; and actuator means for moving said stationary brake elements between said first and said second positions.

2. A fluid brake arrangement as claimed in claim 1 wherein said stationary brake elements comprise a plurality of circumferentially spaced baffle elements each having a polar axis extending substantially parallel with the runner main axis, said actuator means including positioning means for rotating the stationary baffle elements about their respective polar axes between said second inoperative position in substantially streamlined edgewise relation with the direction of rotation of fluid entrained with said runner brake elements, first operative positions in facing, flow blocking relation with the fluid entrained by the runner brake elements.

3. A fluid brake arrangement as claimed in claim 1 wherein said stationary brake elements include a plurality of transversely extending baffle element portions in flow opposing relation with said runner fluid energizing cups and displaceable between first operative positions adjacent the runner energizing cups and second inoperative positions withdrawn from said cups.

4. A fluid brake as claimed in claim 3 wherein said stationary elements are mounted for axial displacement substantially parallel with the main axis of the runner.

5. A fluid brake as claimed in claim 2 wherein said actuator means include crank means for rotating the baffle elements through substantially 90° between a position facing radially inwardly towards the main axis of the runner in streamlined relation with entrained rotating fluid energized by the runner brake cups, and a position normal thereto in substantial fluid flow interfering relation with the entrained fluid.

6. A fluid brake as claimed in claim 4 wherein said actuator means includes piston and cylinder means for moving the stationary brake elements between operative and inoperative positions, and motor control means operable by runner speed sensor means to position said brake elements in the operative position upon the occurrence of overspeeding of the runner.

7. A fluid brake as claimed in claim 5 wherein said actuator means include motor means for moving the stationary brake elements between operative and inoperative positions, and motor control means operable by runner speed sensor means, to position said brake elements in the operative position upon the occurrence of overspeeding of the runner.

8. A fluid brake as claimed in claim 6 wherein said servo motor means are air operated, each having a cylinder portion receiving a said brake element mounted on a piston in sliding relation within the cylinder, and movable outwardly from the cylinder into the operative position on the application of pressurized air to the cylinder, whereby on release of the pressurized air to atmosphere the piston mounted brake elements are withdrawn under the working pressure of fluid within the machine annular space.

References Cited
UNITED STATES PATENTS

| | | | |
|---|---|---|---|
| 3,139,166 | 6/1964 | Berlyn | 253—59 X |
| 3,226,083 | 12/1965 | Braikevitch et al. | 253—26 |
| 3,246,874 | 4/1966 | Sproule | 253—26 |

FOREIGN PATENTS

| | | |
|---|---|---|
| 934,106 | 8/1963 | Great Britain. |

MARTIN P. SCHWADRON, Primary Examiner.

E. A. POWELL, Jr., Assistant Examiner.